(12) United States Patent
Yang et al.

(10) Patent No.: US 9,564,979 B2
(45) Date of Patent: Feb. 7, 2017

(54) MISMATCH COMPENSATING DEVICE AND METHOD, AND MISMATCH DETECTING DEVICE

(71) Applicant: MStar Semiconductor, Inc., Hsinchu (TW)

(72) Inventors: Tzu-Yi Yang, Zhubei (TW); Tai-Lai Tung, Zhubei (TW)

(73) Assignee: MSTAR SEMICONDUCTOR, INC., Hsinchu (TW)

(*) Notice: Subject to any disclaimer, the term of this patent is extended or adjusted under 35 U.S.C. 154(b) by 0 days.

(21) Appl. No.: 15/173,973

(22) Filed: Jun. 6, 2016

(65) Prior Publication Data
US 2017/0005737 A1  Jan. 5, 2017

(30) Foreign Application Priority Data
Jul. 1, 2015 (TW) .............................. 104121288 A

(51) Int. Cl.
*H04B 17/11* (2015.01)

(52) U.S. Cl.
CPC .................................... *H04B 17/11* (2015.01)

(58) Field of Classification Search
CPC ...................................................... H04B 17/11
USPC ......................................................... 375/295
See application file for complete search history.

(56) References Cited

U.S. PATENT DOCUMENTS

| | | | |
|---|---|---|---|
| 7,570,923 B2 | 8/2009 | Kiss et al. | |
| 8,478,222 B2* | 7/2013 | Wortel | H04L 27/3863 375/296 |
| 8,867,596 B2* | 10/2014 | Su | H04B 17/0062 375/226 |
| 9,276,798 B2* | 3/2016 | Yu | H04L 27/364 |
| 2002/0015450 A1* | 2/2002 | Ratto | H04L 27/2071 375/261 |
| 2006/0063497 A1 | 3/2006 | Nielsen | |
| 2008/0025381 A1* | 1/2008 | Lee | H04B 1/30 375/219 |
| 2011/0013724 A1 | 1/2011 | Metreaud et al. | |

OTHER PUBLICATIONS

Taiwan Intellectual Property Office, "Office Action", issued on Jul. 1, 2016.

* cited by examiner

*Primary Examiner* — Freshteh N Aghdam
(74) *Attorney, Agent, or Firm* — WPAT, PC; Justin King

(57) ABSTRACT

A mismatch compensating device includes: a signal generator, synchronously outputting first and second signal; a gain and phase compensator, processing the first and second signals according to a gain parameter and a phase parameter to generate compensated first and second signals; a DAC, performing a digital-to-analog conversion on the compensated first and second signals to generate first and second analog signals; an analog front-end circuit, processing the first and second analog signals to output a joint signal; a mismatch detecting circuit, detecting the power of the joint signal to generate a detection result; a frequency-dependent mismatch compensator, compensating at least one of the first and second signals; and a control circuit, setting the gain and phase parameters and a parameter of the frequency-dependent mismatch compensator according to the detection result to compensate frequency-independent gain and phase mismatch and a frequency-dependent mismatch response.

15 Claims, 9 Drawing Sheets

MISMATCH COMPENSATING DEVICE AND METHOD, AND MISMATCH DETECTING DEVICE

This application claims the benefit of Taiwan application Serial No. 104121288, filed Jul. 1, 2015, the subject matter of which is incorporated herein by reference.

BACKGROUND OF THE INVENTION

Field of the Invention

The invention relates in general to a mismatch processing technology, and more particularly, to a mismatch processing technology for processing in-phase and quadrature-phase (IQ) mismatch.

Description of the Related Art

Communication technologies adopting in-phase and quadrature-phase modulations (e.g, the orthogonal frequency division multiplexing (OFDM) communication technology) usually encounter in-phase and quadrature-phase (IQ) mismatch. To solve this problem, frequency-dependent gain and phase mismatch and frequency-independent gain and phase mismatch are often separately detected and compensated in the prior arts. The frequency-dependent mismatch is caused by a low-pass filter (LPF) in an in-phase signal transmission path and a LPF in a quadrature-phase signal transmission path. The frequency-independent mismatch is caused by a modulator in the in-phase signal transmission path and a modulator in the quadrature-phase signal transmission path.

In current technologies, the frequency-dependent mismatch and the frequency-independent mismatch are separated detected and compensated (e.g., the frequency-dependent mismatch is first detected and compensated, and the frequency-independent mismatch is then detected and compensated). Thus, the current technologies may not only consume more operation time but also suffer from certain issues such as sampling phase difference caused by mismatch.

For example, some details of the prior art may be referred from the U.S. Pat. No. 7,570,923.

SUMMARY OF THE INVENTION

The invention is directed to a mismatch compensating device and method and a mismatch detecting device for improving the prior art.

The present invention discloses a mismatch compensating device capable of synchronously processing a frequency-dependent mismatch response and frequency-independent gain and phase mismatch. According to an embodiment, the mismatch compensating device includes a signal generator, a gain and phase compensator, a digital-to-analog converter (DAC), a transmitter analog front-end circuit, a mismatch detecting circuit, a frequency-dependent mismatch compensator, and a control circuit. The signal generator synchronously outputs a first signal and a second signal. The gain and phase compensator processes the first and second signals according to a gain parameter and a phase parameter to generate a compensated first signal and a compensated second signal. The DAC performs a digital-to-analog conversion on the compensated first signal and the compensated second signal to generate a first analog signal and a second analog signal, respectively. The transmitter analog front-end circuit processes the first and second analog signals to output a joint signal. The mismatch detecting circuit detects the power of the joint signal to generate a detection result, which is associated with the gain parameter and the phase parameter. The frequency-dependent mismatch compensator compensates at least one of the first and second signals to compensate the frequency-dependent mismatch response. The control circuit sets the gain parameter and the phase parameter according to the detection result to compensate the frequency-independent gain and phase mismatch, and sets the parameter of the frequency-dependent mismatch compensator according to the detection result to compensate the frequency-dependent mismatch response.

The present invention further discloses a mismatch compensating method capable of synchronously processing a frequency-dependent mismatch response and frequency-independent gain and phase mismatch. According to an embodiment, the mismatch compensating method includes: synchronously outputting a first signal and a second signal; processing the first and second signals according to a gain parameter and a phase parameter to generate a compensated first signal and a compensated signal; performing a digital-to-analog conversion on the compensated first signal and the compensated second signal to generate a first analog signal and a second analog signal, respectively; processing the first and second analog signals to output a joint signal; detecting the power of the joint signal to generate a detection result, which is associated with the gain parameter and the phase parameter; setting the gain parameter and the phase parameter according to the detection result to compensate the frequency-independent gain and phase mismatch; and setting at least one compensation parameter according to the detection result to compensate the frequency-dependent mismatch response, wherein the at least one compensation parameter is used for compensating at least one of the first and second signals.

The present invention further discloses a mismatch detecting device capable of detecting frequency-dependent mismatch and frequency-independent mismatch. According to an embodiment, the mismatch detecting device includes a test signal transmitting circuit and a mismatch detecting circuit. The test signal transmitting circuit synchronously outputs an in-phase signal and a quadrature-phase signal, and includes: an in-phase transmission path, transmitting the in-phase signal; a quadrature-phase transmission path, transmitting the in-phase signal; and an operator, coupled to the in-phase and quadrature transmission paths, generating a joint signal according to the in-phase and quadrature signals transmitted. The mismatch detecting circuit detects the power of the joint signal to generate a detection result, and includes: a pre-processing circuit, generating a digital signal according to the joint signal; a receiver digital front-end circuit, generating a signal to be detected according to the digital signal; and a power detector, detecting the power of the signal to be detected to generate the detection result.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a device and a method. A part of the elements of the device may be individually known elements. Without affecting full disclosure of the device and in possible implementation, details of the individually known elements are omitted. A combination of a part or all of the steps of the method may be in form of software and/or firmware, and may be performed by the device of the present invention or an equivalent device.

Figure 1A:
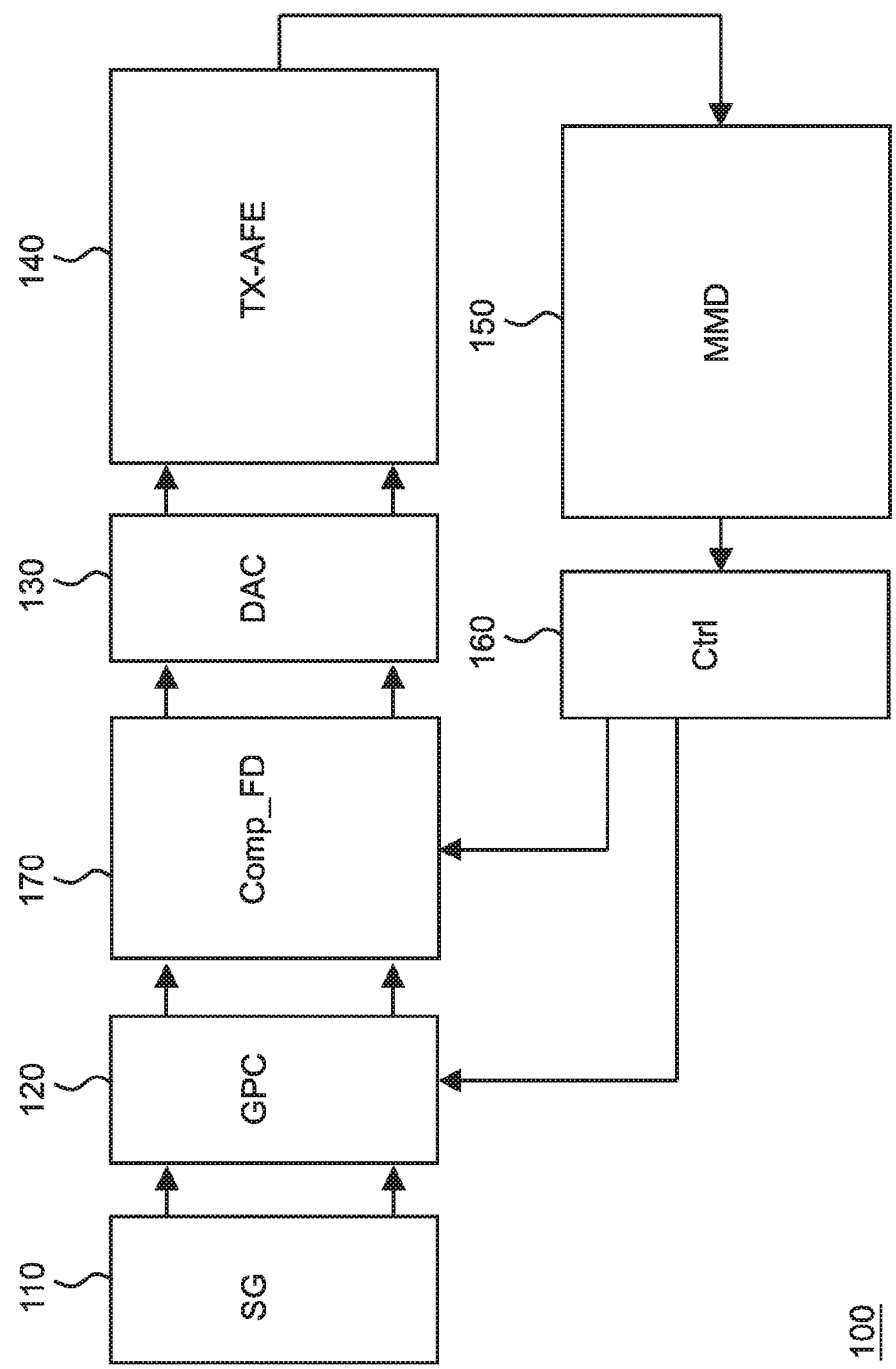
FIG. 1a is a schematic diagram of a mismatch compensating device according to an embodiment of the present invention.

FIG. 1a shows a schematic diagram of a mismatch compensating device 100 according to an embodiment of the present invention. The mismatch compensating device 100 according to the embodiment, capable of synchronously processing frequency-dependent gain and phase mismatch and frequency-independent gain and phase mismatch, includes a signal generator (denoted as SG) 110, a gain and phase compensator (denoted as GPC) 120, a digital-to-analog converter (DAC, denoted as DAC) 130, a transmitter analog front-end circuit (denoted as TX-AFE) 140, a mismatch detecting circuit (denoted as MMD) 150, a control circuit (denoted as Ctrl) 160, and a frequency-dependent mismatch compensator (denoted as Comp_FD) 170. To better understand the present invention, operations of the mismatch compensating device 100 are described in brief below, and associated details are described in later paragraphs.

1. To adjust frequency-independent (FI) and frequency-dependent (FD) gain and phase mismatch, assuming that the gain and phase compensator 120 sequentially adjusts gain and phase parameters, the mismatch detecting circuit 150 first obtains "an optimal detection power pwr($\omega_k$) under an angular frequency $\omega_k$" according to the signal generated by the signal generator 110. The gain and phase parameters adopted for obtaining the optimal detection power pwr($\omega_k$) may be regarded as optimal gain and phase parameters (g($\omega_k$), θ($\omega_k$)). Equations of approximate values of the gain and phase parameters are as shown in equation (16).

2. Next, the control circuit 160 obtains "frequency-independent gain difference and phase difference $g_{FI}$ and $\theta_{FI}$" in equation (17) below according to equation (16) and known (or pre-acquired) in-phase and quadrature-phase mismatch characteristics. The control circuit 160 then sets the gain parameter and the phase parameter of the gain and phase compensator 120 according to the gain difference $g_{FI}$ and the phase difference and $\theta_{FI}$ in equation (17) to compensate the frequency-independent mismatch.

3. After the result of equation (17) is obtained, by substituting the result of equation (17) into equation (16), the approximate values of the frequency-dependent gain difference and phase difference $g_{FD}(\omega_k)$ and $\theta_{FD}(\omega_k)$ shown in equation (18) may be obtained. Further, according to the definition of a frequency-dependent in-phase and quadrature-phase mismatch response $H_{FD}[k]$, the frequency-dependent mismatch response $H_{FD}[k]$ may be represented by equation (19). Thus, since the gain difference $g_{FD}(\omega_k)$ and the phase difference $\theta_{FD}(\omega_k)$ in equation (19) can be obtained from equation (18), the control circuit 160 may accordingly set the parameter of the frequency-dependent mismatch compensator 170 to generate a frequency-dependent mismatch compensating response $h_{FD}[n]$, as shown in equation (20). Thus, the frequency-dependent mismatch response $H_{FD}[k]$ may be counteracted or reduced by the mismatch compensating response $h_{FD}[n]$.

It should be noted that, although the derivation process of the compensation setting below may not explain the effect that the frequency-dependent mismatch compensator 170 has on signals, such effect may be regarded as being reflected in the frequency-dependent gain difference and phase difference $g_{FD}(\omega_k)$ and $\theta_{FD}(\omega_k)$. That is, if a part of the frequency-dependent mismatch response $H_{FD}[k]$ is counteracted by the mismatch compensator 170, the part that is not yet counteracted is reflected by the gain difference $g_{FD}(\omega_k)$ and the phase difference $\theta_{FD}(\omega_k)$. Certainly the effect on the signals may also be prevented by methods such as appropriate parameter settings or a bypass design during the process that the mismatch compensator 170 obtains the compensation setting.

Again referring to FIG. 1a, the signal generator 110 synchronously outputs a first signal I(t) and a second signal Q(t). The two signals are transmitted via different paths to the transmitter analog front-end circuit 140 to become a signal Ĩ(t) and a signal Q̃(t), respectively. Assuming that the first and second signals I(t) and Q(t) are in-phase and quadrature-phase signals, respectively, without considering the effect of the gain and phase compensator 120, the relationship of the signals may be represented by equation (1) below:

$$\begin{bmatrix} \tilde{I}(t) \\ \tilde{Q}(t) \end{bmatrix} = \begin{bmatrix} \cos(\theta_{FI}/2) & \sin(\theta_{FI}/2) \\ \sin(\theta_{FI}/2) & \cos(\theta_{FI}/2) \end{bmatrix} \cdot \begin{bmatrix} 1 & 0 \\ 0 & g_{FI} \end{bmatrix} \cdot \begin{bmatrix} 1 & 0 \\ 0 & g_{FD}(\omega) \end{bmatrix} \cdot \begin{bmatrix} \cos(\theta_{FD}(\omega)/2) & \sin(\theta_{FD}(\omega)/2) \\ \sin(\theta_{FD}(\omega)/2) & \cos(\theta_{FD}(\omega)/2) \end{bmatrix} \cdot \begin{bmatrix} I(t) \\ Q(t) \end{bmatrix}$$

equation (1)

-continued $$\equiv \begin{bmatrix} m_{1,1} & m_{1,2} \\ m_{2,1} & m_{2,2} \end{bmatrix} \begin{bmatrix} I(t) \\ Q(t) \end{bmatrix} = M \cdot \begin{bmatrix} I(t) \\ Q(t) \end{bmatrix}$$

In equation (1), the symbols $g_{FI}$ and $\theta_{FI}$ represent frequency-independent gain difference and phase difference, respectively; symbols $g_{FD}(\omega)$ and $\theta_{FD}(\omega)$ represent frequency-dependent gain difference and phase difference, respectively; M represents a mismatch matrix; and values $m_{1,1}$ to $m_{2,2}$ are as shown by equation (2) below:

$m_{1,1}=\cos(\theta_{FI}/2)\cos(\theta_{FD}(\omega)/2)+g_{FI}g_{FD}(\omega)\sin(\theta_{FI}/2)\sin(\theta_{FD}(\omega)/2)$ $m_{1,2}=\cos(\theta_{FI}/2)\sin(\theta_{FD}(\omega)/2)+g_{FI}g_{FD}(\omega)\sin(\theta_{FI}/2)\cos(\theta_{FD}(\omega)/2)$ $m_{2,1}=\sin(\theta_{FI}/2)\cos(\theta_{FD}(\omega)/2)+g_{FI}g_{FD}(\omega)\cos(\theta_{FI}/2)\sin(\theta_{FD}(\omega)/2)$ $m_{2,2}=\sin(\theta_{FI}/2)\sin(\theta_{FD}(\omega)/2)+g_{FI}g_{FD}(\omega)\cos(\theta_{FI}/2)\cos(\theta_{FD}(\omega)/2)$ equation (2)

It should be noted that, when there is no mismatch, i.e., the first and second signals I(t) and Q(t) are equal to the signals $\tilde{I}(t)$ and $\tilde{Q}(t)$, $m_{1,1}=m_{2,2}=1$ and $m_{1,2}=m_{2,1}=0$. Further, it should be noted that, in the embodiment, the signal generator 110 may control the angular frequencies of the first and second signals $\tilde{I}(t)$ and $\tilde{Q}(t)$ to be $\omega=2\pi k f_{66}$, such that the angular frequencies change according to a predetermined change rate (e.g., $f_\Delta$), where k is an integer and the range of k is determined according to a predetermined bandwidth (e.g., the range of k causes the frequency $\omega/2\pi$ to cover the predetermined bandwidth, and the predetermined bandwidth is a bandwidth of a communication circuit applied in the present invention). Further, it should be noted that, assuming that the first and second signals $\tilde{I}(t)$ and $\tilde{Q}(t)$ are signals other than in-phase and quadrature-phase signals, one person skilled in the art may deduce the signal relationship and corresponding parameter settings based on the disclosure of the application.

Figure 2:
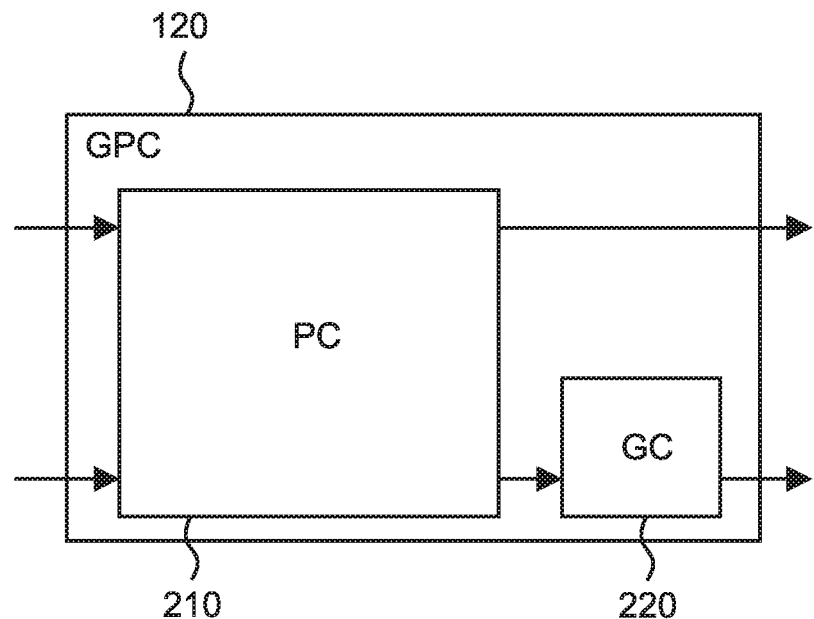
FIG. 2 is a schematic diagram of a gain and phase compensator in FIG. 1a according to an embodiment.
Figure 3:
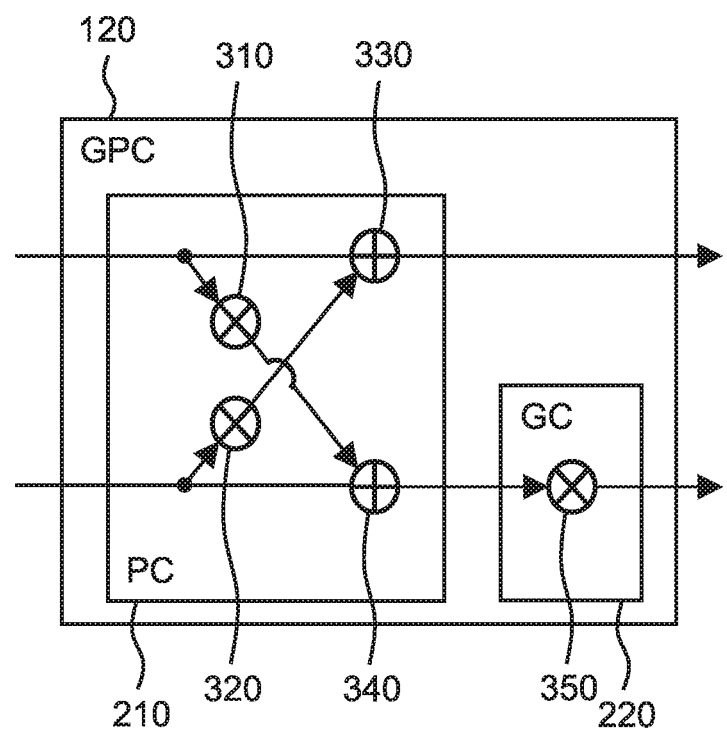
FIG. 3 is a schematic diagram of a gain compensator and a phase compensator in FIG. 2 according to an embodiment.

Referring to FIG. 1a, the gain and phase compensator 120 processes the first and second signals I(t) and Q(t) according to a gain parameter $\delta$ and a phase parameter $\phi$ to generate a compensated first signal C·I(t) and a compensated second signal C·Q(t). As shown in FIG. 2, the gain and phase compensator 120 according to an embodiment includes a phase compensator (denoted as PC) 210 and a gain compensator (denoted as GC) 220. The phase compensator 210 generates the compensated first signal C·I(t) according to the phase parameter $\phi$ as well as the first and second signals I(t) and Q(t), and generates a phase compensated signals according to the phase parameter $\phi$ as well as the first and second signals I(t) and Q(t). The gain compensator 220 generates the compensated second signal C·Q(t) according to the gain parameter $\delta$ and the phase compensated signal. As shown in FIG. 3, the phase compensator 210 according to an embodiment includes: a first multiplier 310, processing the first signal I(t) according to the phase parameter $\phi$ to generate a first multiplied signal; a second multiplier 320, processing the second signal Q(t) according to the phase parameter $\phi$ to generate the second multiplied signal; a first adder 330, generating the compensated first signal C·I(t) according to the first signal I(t) and the second multiplied signal; and a second adder 340, generating the phase compensated signal according to the second signal Q(t) and the first multiplied signal. As shown in FIG. 3, the gain compensator 220 according to an embodiment includes: a third multiplier 350, processing the phase compensated signal according to the gain parameter $\delta$ to generate the compensated second signal C·Q(t). For example, the multiplicands of the first multiplier 310 and the second multiplier 320 in FIG. 3 are both caused to be $\phi/2$ and the multiplicand of the third multiplier 350 is caused to be $\delta$, and the compensation result C contributed by the phase compensator 210 and the gain compensator 220 in FIG. 3 may be represented by equation (3) below:

$$C = \begin{bmatrix} 1 & 0 \\ 0 & \delta \end{bmatrix} \cdot \begin{bmatrix} 1 & \phi/2 \\ \phi/2 & 1 \end{bmatrix} \quad \text{equation (3)}$$

Given the gain parameter $\delta$ and the phase parameter $\phi$ respectively satisfy equation (4) and equation (5) below, they may be referred to as ideal parameters:

$$\delta = -\frac{\beta_1^2 + \beta_1^2\beta_2^2 - \beta_1\beta_2\sqrt{1+\beta_1^2\beta_2^2+\beta_1^2+\beta_2^2}}{\beta_2^2 + \beta_1^2\beta_2^2 - \beta_1\beta_2\sqrt{1+\beta_1^2\beta_2^2+\beta_1^2+\beta_2^2}} \cdot \frac{m_{2,1}}{m_{1,2}} \quad \text{equation (4)}$$

$$\phi = 2 \cdot \frac{\beta_1 + \beta_2}{(1-\beta_1\beta_2)+\sqrt{1+\beta_1^2\beta_2^2+\beta_1^2+\beta_2^2}} \quad \text{equation (5)}$$

In the above equations, $\beta_1=-m_{1,2}/m_{2,2}$ and $\beta_2=-m_{1,2}/m_{2,2}$. By multiplying the matrix M representing the mismatch in equation (1) by the matrix C representing the compensation (or pre-distortion) in equation (3), equation (6) is obtained:

$$M \cdot C = \alpha \cdot \begin{bmatrix} 1 & \gamma/2 \\ -\gamma/2 & 1 \end{bmatrix} \quad \text{equation (6)}$$

Wherein, $\alpha$ and $\gamma$ are respectively shown as equation (7) and equation (8):

$$\gamma = 2 \cdot \frac{(1+\beta_1\beta_2) - \sqrt{1+\beta_1^2\beta_2^2+\beta_1^2+\beta_2^2}}{\beta_1 - \beta_2} \quad \text{equation (7)}$$

$$\alpha = \frac{-(\phi-\gamma) \cdot \det(M)}{2m_{1,2}(1+\gamma^2/4)} \quad \text{equation (8)}$$

In equation (8), $\det(M)=m_{1,1} \cdot m_{2,2}-m_{1,2} \cdot m_{2,1}$.

Further, assuming that the parameters $\delta$ and $\phi$ are $\delta(\omega)$ and $\phi(\omega)$, respectively, as the values of $\theta_{FD}(\omega)$ and $\theta_{FI}$ are extremely small and $g_{FI} \cdot g_{FI}(\omega)$ is approximate to 1, $\delta(\omega)$ and $\phi(\omega)$ may be mathematically approximate to equation (9) and equation (10):

$$\hat{\delta}(\omega) \approx (g_{FI}g_{FD}(\omega))^{-1} \quad \text{equation (9)}$$

$$\hat{\phi}(\omega) \approx -(\theta_{FI}+\theta_{FD}(\omega)) \quad \text{equation (10)}$$

Figure 4:
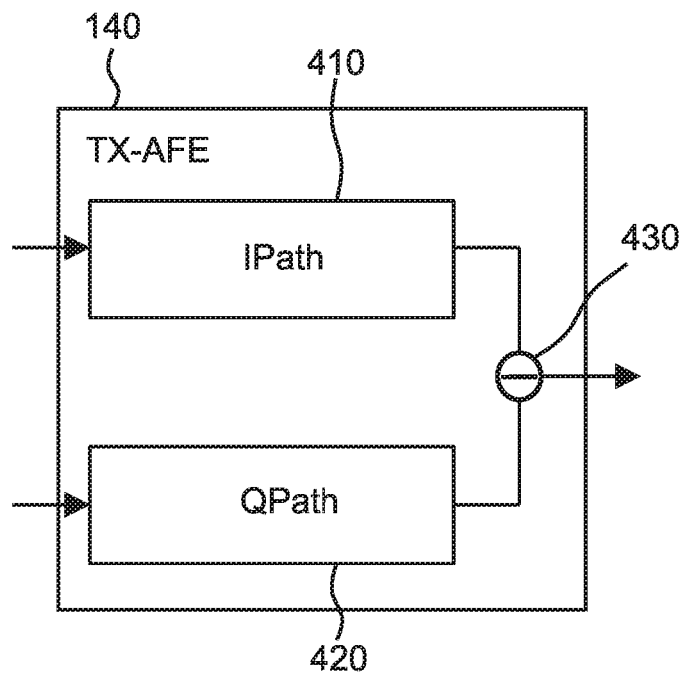
FIG. 4 is a schematic diagram of a transmitter analog front-end circuit in FIG. 1a according to an embodiment.

Again referring to FIG. 1a, the DAC 130 performs a digital-to-analog conversion on the compensated first signal C·I(t) and the compensated second signal C·Q(t) to generate a first analog signal and a second analog signal. The transmitter analog front-end circuit 140 processes the first and second analog signals to output a joint signal. As shown in FIG. 4, the transmitter analog front-end circuit 140 according to an embodiment includes: a first transmission path (denoted as IPath) 410, performing a first filter process and a first modulation process (e. g., a first low-pass filter process and a first frequency up-conversion process) on the first analog signal to generate a first modulated signal; a second transmission path (denoted as QPath) 420, performing a second filter process and a second modulation process (e.g., a second low-pass filter process and a second frequency up-conversion process) on the second analog signal to generate a second modulated signal; and an operator 430, generating the joint signal according to the first and second modulated signals. For example, the operator 430 may subtract the second modulated signal from the first modulated signal to generate the joint signal. The first and second filter processes may be respectively performed by a first filter and a second filter, and are the main factors causing the frequency-dependent gain difference and phase difference $f_{FD}(\omega)$ and $\theta_{FD}(\omega)$. The first and second modulation processes may be performed by a modulator, and are the main factors causing the frequency-independent gain difference and phase difference $f_{FI}$ and $\theta_{FI}$.

Figure 5:
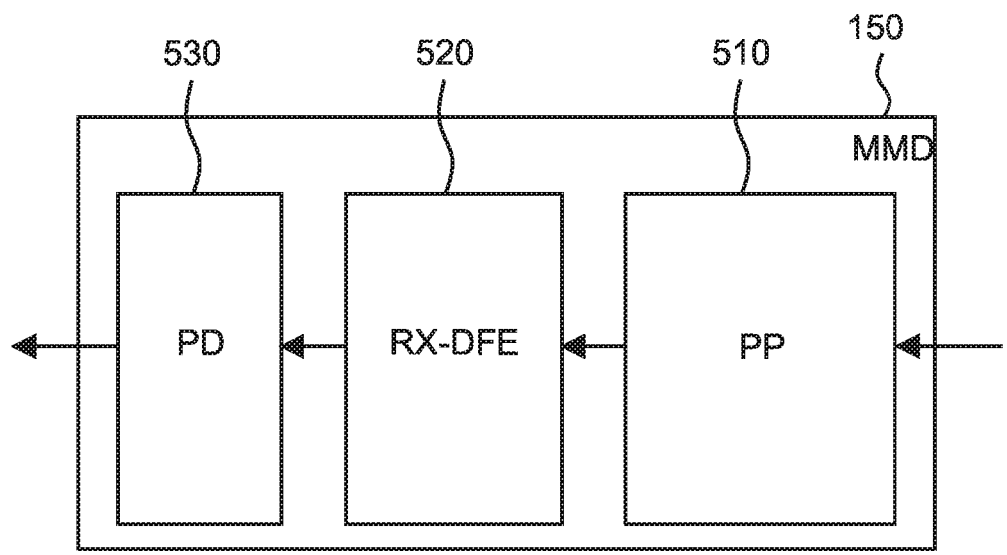
FIG. 5 is a schematic diagram of a mismatch detecting circuit in FIG. 1a according to an embodiment.
Figure 6:
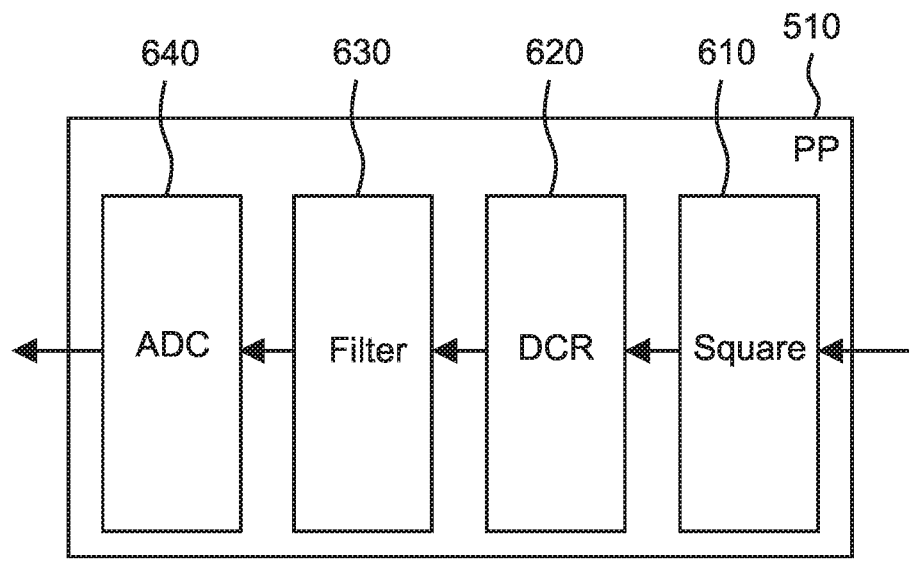
FIG. 6 is a schematic diagram of a pre-processing circuit in FIG. 5 according to an embodiment.
Figure 7:
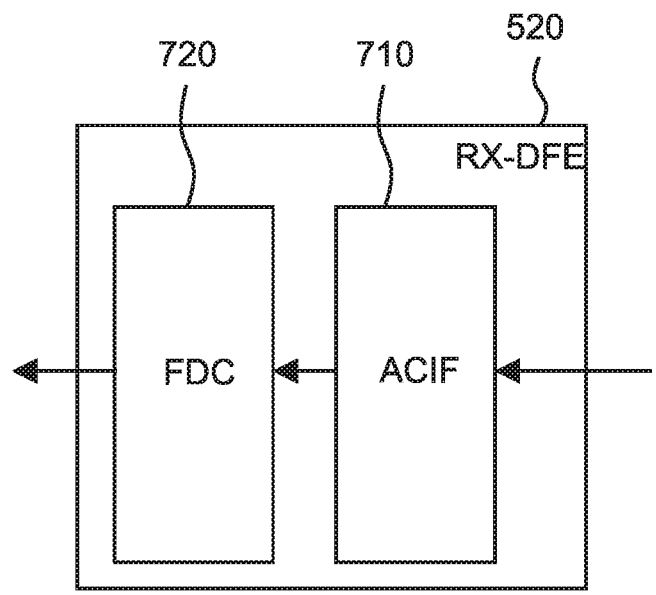
FIG. 7 is a schematic diagram of a receiver digital front-end circuit in FIG. 5 according to an embodiment.

Again referring to FIG. 1a, the mismatch detecting circuit 150 detects the power of the joint signal to generate a detection result. As shown in FIG. 5, the mismatch detecting circuit 150 according to an embodiment includes: a pre-processing circuit (denoted as PP) 510, generating a digital signal according to the joint signal; a receiver digital front-end circuit (denoted as RX-DFE) 520, generating a signal to be detected according to the digital signal; and a power detector (denoted as PD) 530, detecting the power of the signal to be detected to generate the detection result. As shown in FIG. 6, the pre-processing circuit 510 according to an embodiment includes: a square generating operator (denoted as Square) 610, performing a positive value generating operation on the joint signal to generate a first processed signal; a direct-current remover (denoted as DCR) 620, performing a direct-current removal process on the first processed signal to generate a second processed signal. For example, the direct-current remover 620 may be implemented by a high-pass filter (e.g., a one-order high-pass filter having an extremely low 3dB bandwidth, or an equivalent circuit); a filter (denoted as Filter) 630, performing a filter process on the second processed signal to generate a third processed signal, and capable of preliminarily filtering noises (e.g., high-frequency noises); and an analog-to-digital converter (ADC, denoted as ADC) 640, performing an analog-to-digital conversion on the third processed signal to generate the digital signal. As shown in FIG. 7, the receiver front-end circuit 520 according to an embodiment includes: an adjacent channel interference (ACI) filter (denoted as ACIF) 710, performing an ACI filter process on the digital signal to generate a filtered signal, capable of reinforcing noise filtering, implemented by a finite impulse response (FIR) filter or an equivalent circuit; and a frequency down-converter (denoted as FDC) 720, performing a frequency down-conversion on the filtered signal to generate the signal to be detected.

Referring to FIG. 1a, FIG. 5, FIG. 6 and FIG. 7, given the effect of the gain and phase compensator 120 is temporarily not considered, the first and second signals I(t) and Q(t) outputted by the DAC 130 may be represented by equation 11 (where A represents the amplitude):

$$\begin{cases} I(t) = A\cos(2\pi k f_\Delta t) \\ Q(t) = A\sin(2\pi k f_\Delta t) \end{cases} \quad \text{equation (11)}$$

Based on equation (11) and the above assumption, after a series of known deductions, a digital signal r[n] generated by the ADC 640 may be represented by equation (12):

$$r[n] = \frac{A^2 g_{path}}{4} \quad \text{equation (12)}$$

-continued
$$\sqrt{(m_{1,1}^2 + m_{2,1}^2 - m_{1,2}^2 - m_{2,2}^2)^2 + 4(m_{1,1}m_{1,2} + m_{2,1}m_{2,2})^2}$$
$$\cos\!\left(4\pi k f_\Delta \frac{n}{f_{ADC}} + \theta_{ADC}\right)$$

In equation (12), $m_{1,1}$, $m_{1,2}$, $m_{2,1}$ and $m_{2,2}$ are coefficients of the mismatch matrix M, $g_{path}$ represents the gain difference of the transmission path, $f_{ADC}$ represents the operating frequency of the ADC 640, and $\theta_{ADC}$ represents the phase difference caused by the ADC 640. The digital signal r[n] having been processed by the ACI filter 710 and the frequency down-converter 720 becomes the signal to be detected. The power detector 530 may then detect the signal to be detected to generate the detection result pwr, as shown in equation (13):

$$pwr = \frac{1}{N}\sum_{n=0}^{N-1}(r^2[n]) \approx E\{r^2[n]\} = \frac{A^4 g_{path}^2}{32} \quad \text{equation (13)}$$
$$\left((m_{1,1}^2 + m_{2,1}^2 - m_{1,2}^2 - m_{2,2}^2)^2 + 4(m_{1,1}m_{1,2} + m_{2,1}m_{2,2})^2\right)$$

As the value N gets larger, the number of samples of the detection result pwr gets larger, and the associated average result $$\frac{1}{N}\sum_{n=0}^{N-1} r^2[n]$$

also approximates more to a mathematical expected value E. Based on equation (13) and further considering the effect of the gain and phase compensator 120, the compensated mismatch matrix M' is as shown in equation (14):

$$M' = M \cdot C = \alpha \cdot \begin{bmatrix} 1 & \gamma/2 \\ -\gamma/2 & 1 \end{bmatrix} = \begin{bmatrix} \alpha & \alpha\gamma/2 \\ -\alpha\gamma/2 & \alpha \end{bmatrix} \quad \text{equation (14)}$$

By respectively replacing $m_{1,1}$, $m_{1,2}$, $m_{2,1}$ and $m_{2,2}$ in equation (13) by $\alpha$, $\alpha\gamma/2$, $-\alpha\gamma/2$ and $\alpha$ in equation (14), the detection result pwr that is compensated is as shown in equation (15):

$$pwr = \frac{A^4 g_{path}^2}{32}\{(\alpha^2 + (-\alpha\gamma/2)^2 - \alpha^2 - (\alpha\gamma/2)^2)^2 + \quad \text{equation (15)}$$
$$4(\alpha(\alpha\gamma/2) + \alpha(-\alpha\gamma/2))^2\} = 0$$

Based on equation (15), the gain and phase compensator 120 may identify the gain and phase parameters (δ, φ) corresponding to the optimal detection result pwr according to the change in the gain and phase parameters (δ, φ) (e.g., a sequential change) (i.e., the gain and phase parameters (δ, φ) adopted by the gain and phase compensator 120 when the optimal detection result pwr is identified). For example, when the operator 430 of the transmitter analog front-end circuit 140 is a subtractor that subtracts the second modulated signal from the first modulated signal, the detection result pwr is ideally zero. That is, in the absence of mismatch, the first modulated signal is ideally equal to the second modulated signal.

In continuation, when the first and second signals I(t) and Q(t) are respectively in-phase and quadrature-phase signals, and the signal generator 110 controls the angular frequencies of the first and second signals I(t) and Q(t) to be $\omega_k$ (where k is an integer between 0 and k, e.g., k=0, 1, 2, 3, . . . or K, the range of k causes the frequency $\omega/2\pi$ to cover a predetermined bandwidth, which is a bandwidth of a communication circuit applied in the present invention, for example), based on equation (15) and the associated description, the optimal detection result pwr ($\omega_k$) and the corresponding gain and phase parameters ($\delta(\omega_k)$, $\phi(\omega_k)$) under the angular frequency $\omega_k$ may also be identified. According to equation (9) and equation (10), the approximate values of the gain and phase parameters ($\delta(\omega_k)$, $\phi(\omega_k)$) may be represented as equation (16):

$$\hat{\delta}(\omega_k) \approx (g_{FI} g_{FD}(\omega_k))^{-1} \quad \hat{\phi}(\omega_k) \approx -(\theta_{FI} + \theta_{FD}(\omega_k)) \qquad \text{equation (16)}$$

Further, based on the characteristic of in-phase and quadrature-phase mismatch, when the frequency-dependent gain difference and phase difference $g_{FD}(\omega_k)$ and $\theta_{FD}(\omega_k)$ are respectively $g_{FD}(0)=1$ and $\theta_{FD}(0)=0$ when $\omega_k=\omega_0=0$, by substituting the above relationship into equation (16), the frequency-independent gain difference and phase difference $g_{FI}$ and $\theta_{FI}$ may be obtained as shown in equation (17):

$$g_{FI} \approx (\hat{\delta}(0) g_{FD}(0))^{-1} = \hat{\delta}(0)^{-1} \quad \theta_{FI} \approx -(\hat{\phi}(0) + \theta_{FD}(0)) = -\hat{\phi}(0) \qquad \text{equation (17)}$$

The control circuit 160 in FIG. 1a may then set the gain parameter and the phase parameter of the gain and phase compensator 120 according to the gain difference $g_{FI}$ and the phase difference $\theta_{FI}$ in equation (17) to compensate the frequency-independent mismatch. It should be noted that, considering that $\omega_k=\omega_0=0$ causes the signal that the ADC 640 receives to be zero, the signal generator 110 may cause $\omega_0$ to be not equal to zero but to approximate zero when k=0. For example, $\omega_0=2\pi f_\Delta/16$. Similarly, considering that the mismatch of the cut-off frequency of the foregoing predetermined bandwidth is difficult to predict, the signal generator 110 may cause $\omega_k/2\pi$ to be not equal to the cut-off frequency but to approximate the cut-off frequency when k=K (assuming that between $\omega_k/2\pi$ and the cut-off frequency is a smallest difference). For example, $\omega_k=2\pi K f_\Delta - 2\pi f_\Delta/16$. When k is not equal to 0 or K (i.e., when $\omega_k$ falls in the predetermined bandwidth), the signal generator 110 may directly cause $\omega_k=2\pi K f_\Delta$. Certainly one person implementing the present invention may set the frequency according to requirements.

In continuation, by substituting the result of equation (17) into equation (16), the approximate values of the frequency-dependent gain difference and phase difference $g_{FD}(\omega_k)$ and $\theta_{FD}(\omega_k)$ may be represented by equation (18):

$$g_{FD}(\omega_k) \approx (g_{FI} \hat{\delta}(\omega_k))^{-1} = \hat{\delta}(0) \cdot \hat{\delta}(\omega_k)^{-1} \quad \theta_{FD}(\omega_k) \approx -(\theta_{FI} + \hat{\phi}(\omega_k)) = \hat{\phi}(0) - \hat{\phi}(\omega_k) \qquad \text{equation (18)}$$

According to the definition of the frequency-dependent in-phase and quadrature-phase mismatch response $H_{FD}[k]$, the frequency-dependent in-phase and quadrature-phase mismatch response $H_{FD}[k]$ may be represented by equation (19):

$$H_{FD}[k] = g_{FD}(\omega_k) \cdot e^{j\theta_{FD}(\omega_k)} \qquad \text{equation (19)}$$

As the gain difference $g_{FD}(\omega_k)$ and the phase difference $\theta_{FD}(\omega_k)$ in equation (19) may be obtained from equation (18), the control circuit 160 in FIG. 1a may set the parameter of the frequency-dependent mismatch compensator 170 to generate the frequency-dependent mismatch compensating response $h_{FD}[n]$ as shown by equation (20) (where IFFT refers to inverse fast Fourier transform):

$$h_{FD}[n] = IFFT\{H_{FD}[k]\} \qquad \text{equation (20)}$$

Figure 1B:
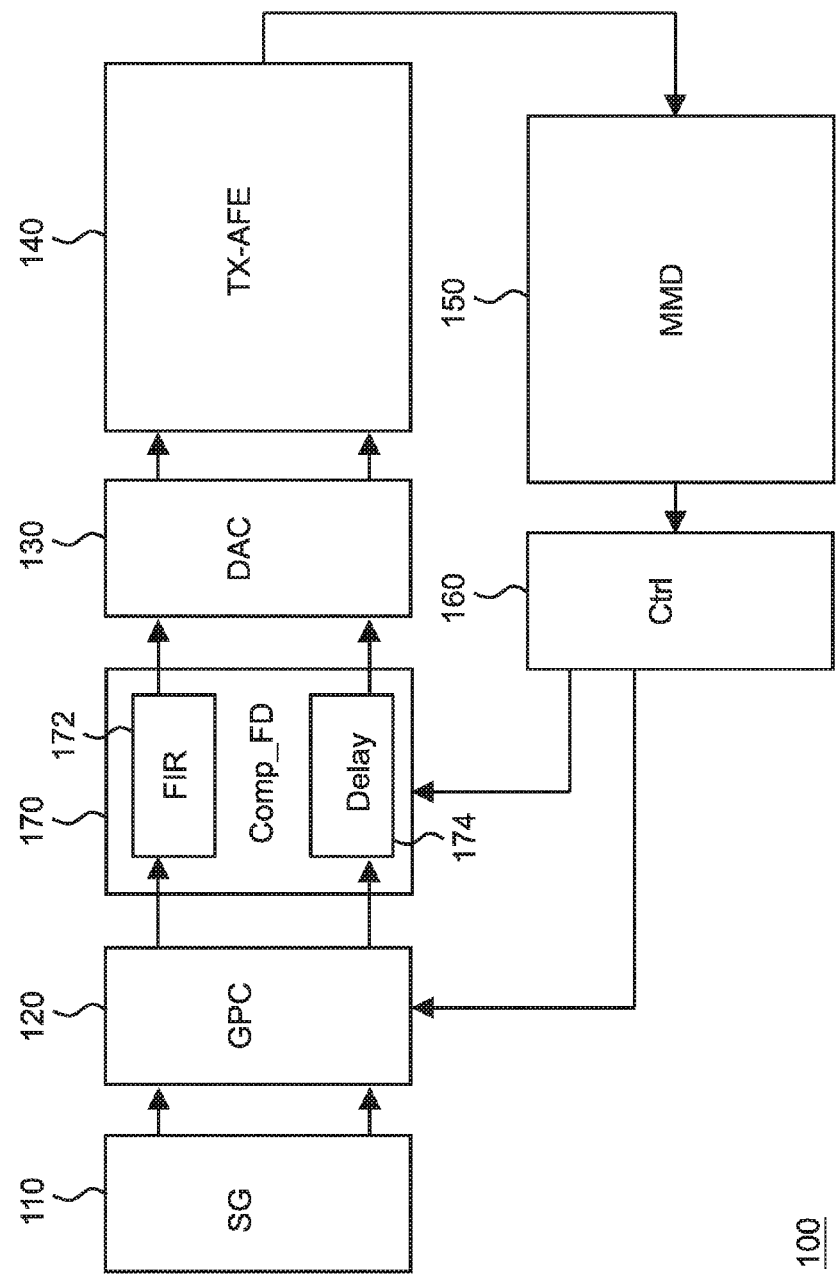
FIG. 1b is a schematic diagram of a frequency-dependent mismatch compensator in FIG. 1a according to an embodiment.

Thus, the frequency-dependent mismatch response $H_{FD}[k]$ may be counteracted or alleviated by the mismatch compensating response $h_{FD}[n]$. The frequency-dependent mismatch compensator 170 may compensate the first signal I(t) or adjust the compensated second signal Q(t) by coordinating with positive/negative signals of corresponding parameters. As shown in FIG. 1b, the frequency-dependent mismatch compensator according to an embodiment includes: N tapped finite impulse response (FIR) filters (denoted as FIR) 172, disposed on the transmission path of the first signal I(t), generating the mismatch compensating response $h_{FD}[n]$; and a delay circuit (denoted as Delay) 174 (e.g., a first-in-first-out (FIFO) delay buffer including (N+1)/2 taps), disposed on the transmission path of the second signal Q(t), causing the first signal I(t) and the second signal Q(t) to be synchronous. For example, the value N is a positive odd number.

Figure 8:
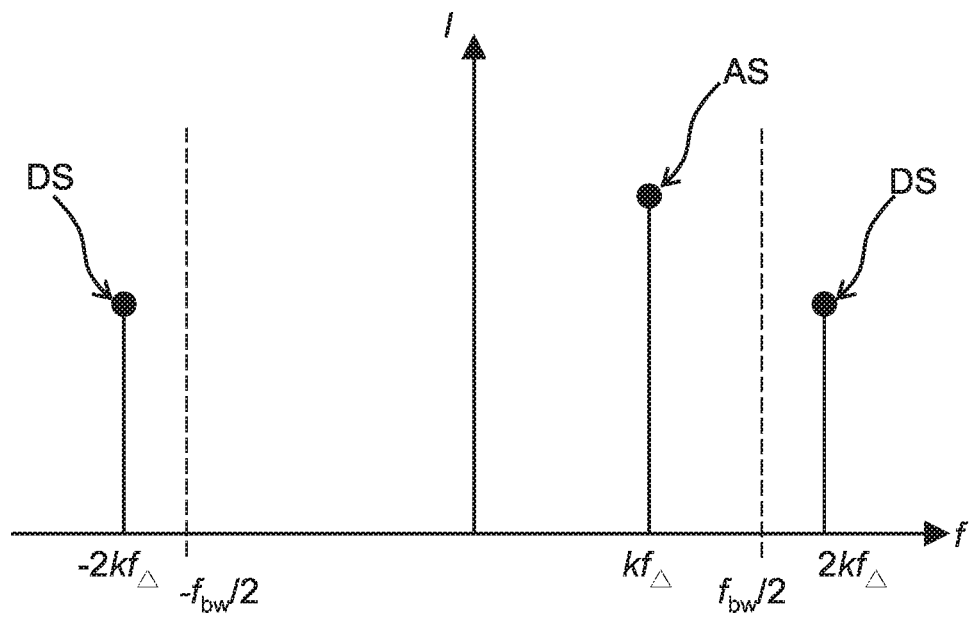
FIG. 8 is a schematic diagram of a digital signal having a frequency that exceeds a predetermined bandwidth.
Figure 9:
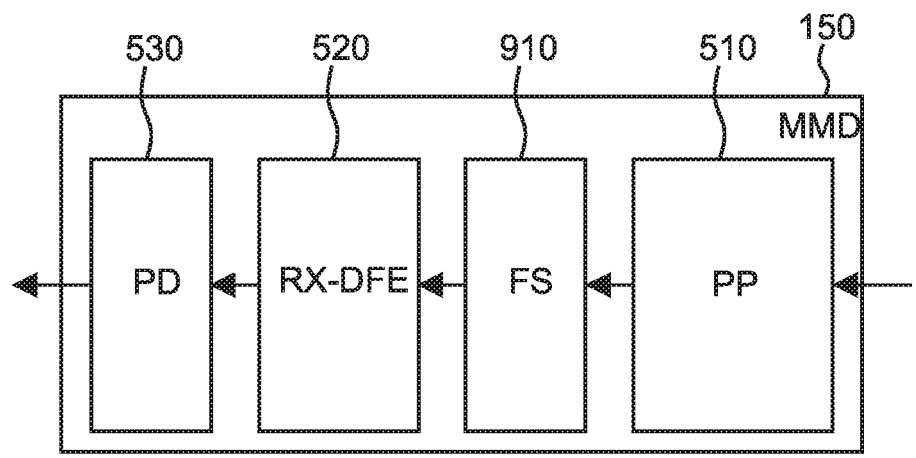
FIG. 9 is a schematic diagram of a mismatch detecting circuit in FIG. 1a according to another embodiment.
Figure 10:
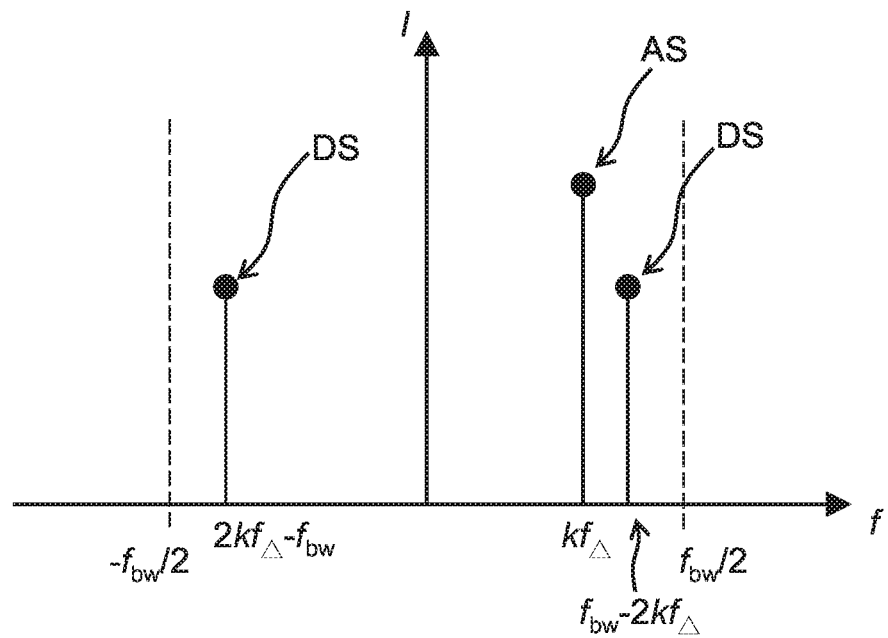
FIG. 10 is a schematic diagram of a digital signal having a frequency that falls in a predetermined bandwidth after the frequency is levelly shifted.

Again referring to FIG. 1a, FIG. 5, FIG. 6 and FIG. 7, by setting the operating frequencies of the DAC 130 and the ADC 640, in an embodiment of the present invention, when the frequencies of the first and second analog signals outputted by the ADC 130 in FIG. 1a are $kf_\Delta$, the frequency of the digital signal generated by the DAC 640 in FIG. 6 is $2kf_\Delta$. Thus, when absolute values of the frequencies $kf_\Delta$ of the first and second analog signals fall between one-quarter and one-half of a predetermined bandwidth $f_{bw}$ on a spectrum analysis (in other words, when the difference between the frequency $kf_\Delta$ and the cut-off frequency of the predetermined bandwidth $f_{bw}$ is smaller than $f_{bw}/4$, wherein the predetermined bandwidth $f_{bw}$ is, for example, the bandwidth of a communication circuit applied in the present invention), the frequency $2kf_\Delta$ of the digital signal exceeds the range of the predetermined bandwidth $f_{bw}$, as shown in FIG. 1. In FIG. 8, the vertical axis represents the signal strength I, the horizontal axis represents the frequency f, AS represents the first or second analog signal, DS represents the digital signal, and the interval formed by dotted lines represents a range of the predetermined bandwidth. The digital signal exceeding the range is eliminated by the ACI filter 710 in FIG. 1, and thus cannot be used to generate the foregoing detection result. To prevent the above issue, the present invention provides another embodiment of the mismatch detecting circuit 150, as shown in FIG. 9. The mismatch detecting circuit 150 in FIG. 9 further includes: a frequency level shifter (denoted as FS) 910, coupled between the pre-processing circuit 510 and the receiver digital processing circuit 520, levelly shifting the frequency of at least a part of the digital signal to cause the frequency of the entire digital signal to fall in the predetermined bandwidth $f_{bw}$. For example, when the absolute values of the frequencies of the first and second analog signals generated by the DAC 130 fall between one-quarter and one-half of the predetermined bandwidth $f_{bw}$ (i.e., $f_{bw}/4 \le kf_\Delta \le f_{bw}/2$), the frequency level shifter 910 subtracts the frequency bandwidth $f_{bw}$ from the frequency of the digital signal having a positive frequency (i.e., $2kf_\Delta$), or adds the frequency bandwidth $f_{bw}$ to the frequency of the digital signal having a negative frequency (i.e., $-2kf_\Delta$), to levelly shift the frequency of at least a part of the digital signal, as shown in FIG. 10.

Figure 11:
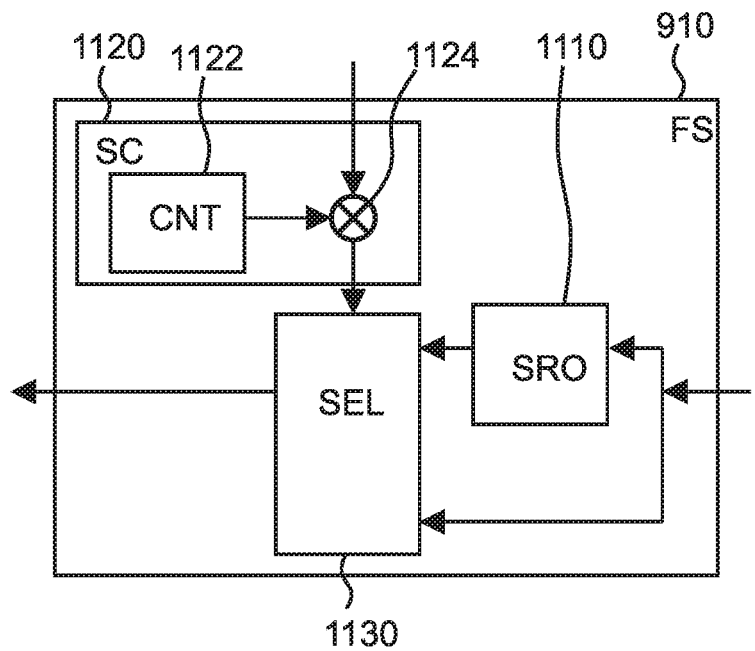
FIG. 11 is a schematic diagram of a frequency level shifter in FIG. 9 according to an embodiment.

The frequency level shifter 910 in FIG. 9 may be realized by a conventional frequency mixer or an equivalent circuit. However, the present invention further provides the frequency level shifter 910 in a simple and effective structure, as shown in FIG. 11. The frequency level shifter 910 in FIG. 11 includes: a sign reverse operator (denoted as SRO) 1110, receiving the digital signal and reversing the digital signal to generate a sign reversed digital signal; a selection controller (denoted as SC) 1120, generating a selection control signal according to a control flag; and a selector (denoted as SEL) 1130, outputting the sign reversed digital signal or the digital signal according to the selection control signal. In the embodiment, the selection controller 1120 includes a counter (denoted as CNT) 1122 and a multiplier 1124. The counter 1122 outputs "1" when a counter value is a multiple of 2 and outputs "0" when the counter value is other values. The multiplier 1124 multiplies the control flag with the output of the counter 1122 to generate the selection control signal. When the absolute values of the frequencies of the first and second analog signals fall between one-quarter and one-half of the predetermined bandwidth $f_{bw}$, the control flag is "1" (meaning that the frequency level shifting function is enabled), or else the control flag is "0" in other situations. It should be noted that, in the above situation of frequency level shifting, equation (12) is adjusted to equation (21):

equation (12)

$$r[n] = \cos(\pi n) \cdot \frac{A^2 g_{path}}{4}$$
$$\sqrt{(m_{1,1}^2 + m_{2,1}^2 - m_{1,2}^2 - m_{2,2}^2)^2 + 4(m_{1,1}m_{1,2} + m_{2,1}m_{2,2})^2}$$
$$\cos\left(4\pi k f_\Delta \frac{n}{f_{ADC}} + \theta_{ADC}\right)$$
$$= \frac{A^2 g_{path}}{4} \sqrt{(m_{1,1}^2 + m_{2,1}^2 - m_{1,2}^2 - m_{2,2}^2)^2 + 4(m_{1,1}m_{1,2} + m_{2,1}m_{2,2})^2}$$
$$\cos\left(2\pi(f_{bw} - 2kf_\Delta)\frac{n}{f_{ADC}} + \theta_{ADC}\right)$$

One person skilled in the art can perform corresponding adjustments of other equations based on equation (21) to implement the present invention.

Figure 12:
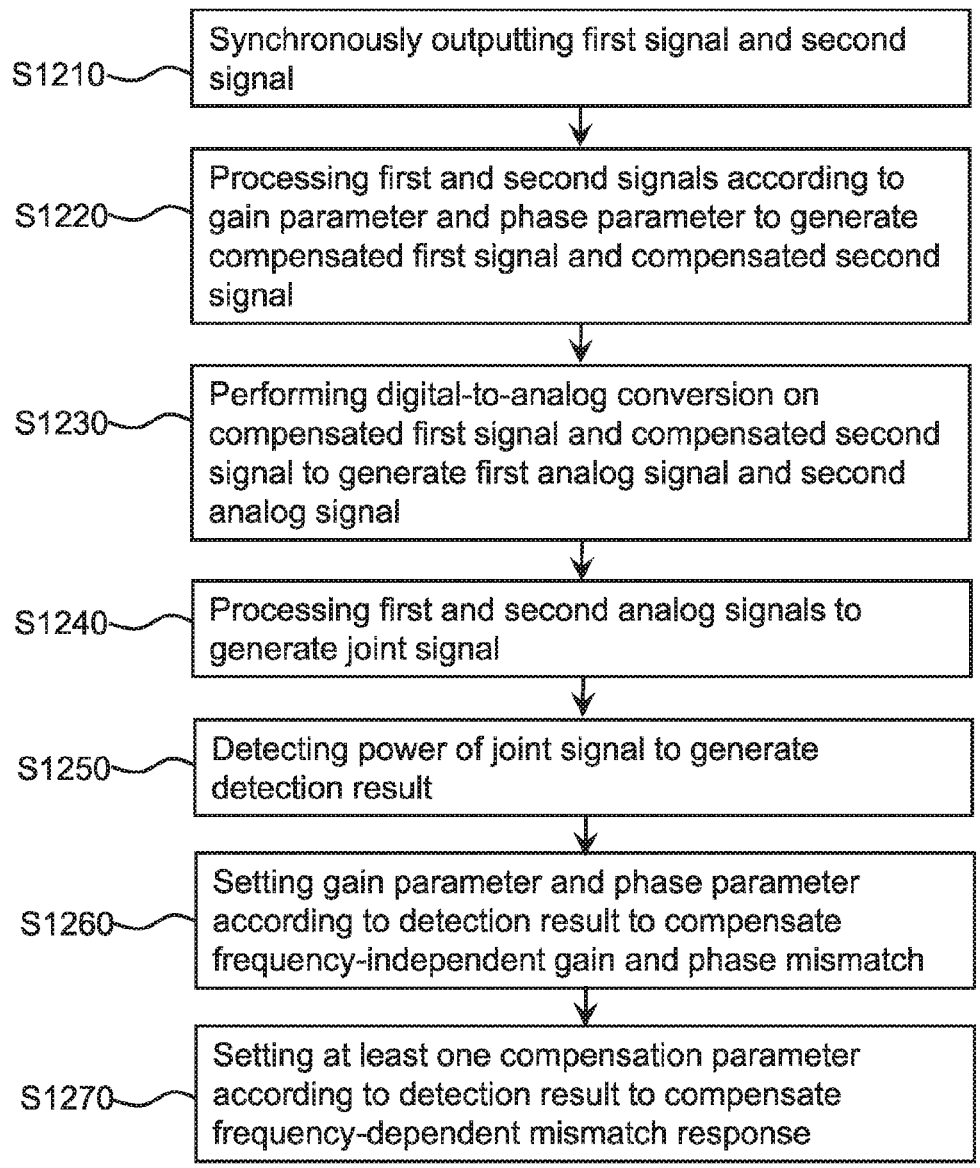
FIG. 12 is a schematic diagram of a mismatch compensating method according to an embodiment of the present invention.

In addition to the foregoing device, the present invention further provides a mismatch compensating method similarly capable of synchronously processing frequency-dependent gain and phase mismatch and frequency-independent gain and phase mismatch. Referring to FIG. 12, the method according to an embodiment includes following steps.

In step S1210, a first signal and a second signal are synchronously outputted. This step may be performed by the signal generator 110 in FIG. 1a or an equivalent circuit.

In step S1220, the first and second signals are processed according to a gain parameter and a phase parameter to generate a compensated first signal and a compensated second signal. This step may be performed by the gain and phase compensator 120 in FIG. 1a or an equivalent circuit.

In step S1230, a digital-to-analog conversion is performed on the compensated first signal and the compensated second signal to generate a first analog signal and a second analog signal. This step may be performed by the DAC 130 in FIG. 1a or an equivalent circuit.

In step S1240, the first and second analog signals are processed to output a joint signal. This step may be performed by the transmitter analog front-end circuit 140 or an equivalent circuit.

In step S1250, the power of the joint signal is detected to generate a detection result, which is associated with the gain parameter and the phase parameter. This step may be performed by the mismatch detecting circuit 150 or an equivalent circuit.

In step S1260, the gain parameter and the phase parameter are set according to the detection result to compensate the frequency-independent gain and phase mismatch. This step may be performed by the control circuit 160 in FIG. 1a or an equivalent circuit.

In step S1270, at least one compensation parameter is set according to the detection result to compensate the frequency-dependent gain and phase mismatch. The at least one compensation parameter is for compensating at least one of the first signal and the second signal. This step may be performed by the control circuit 160 in FIG. 1a or an equivalent circuit.

One person skilled in the art may deduce implementation details and variations of embodiments of the method based on the disclosure of the device of the foregoing embodiments. More specifically, technical features of the device of the foregoing embodiments may be reasonably applied to the method of this embodiment. Without affecting full disclosure and possible implementation of the method of this embodiment, such repeated details are omitted herein.

Figure 13:
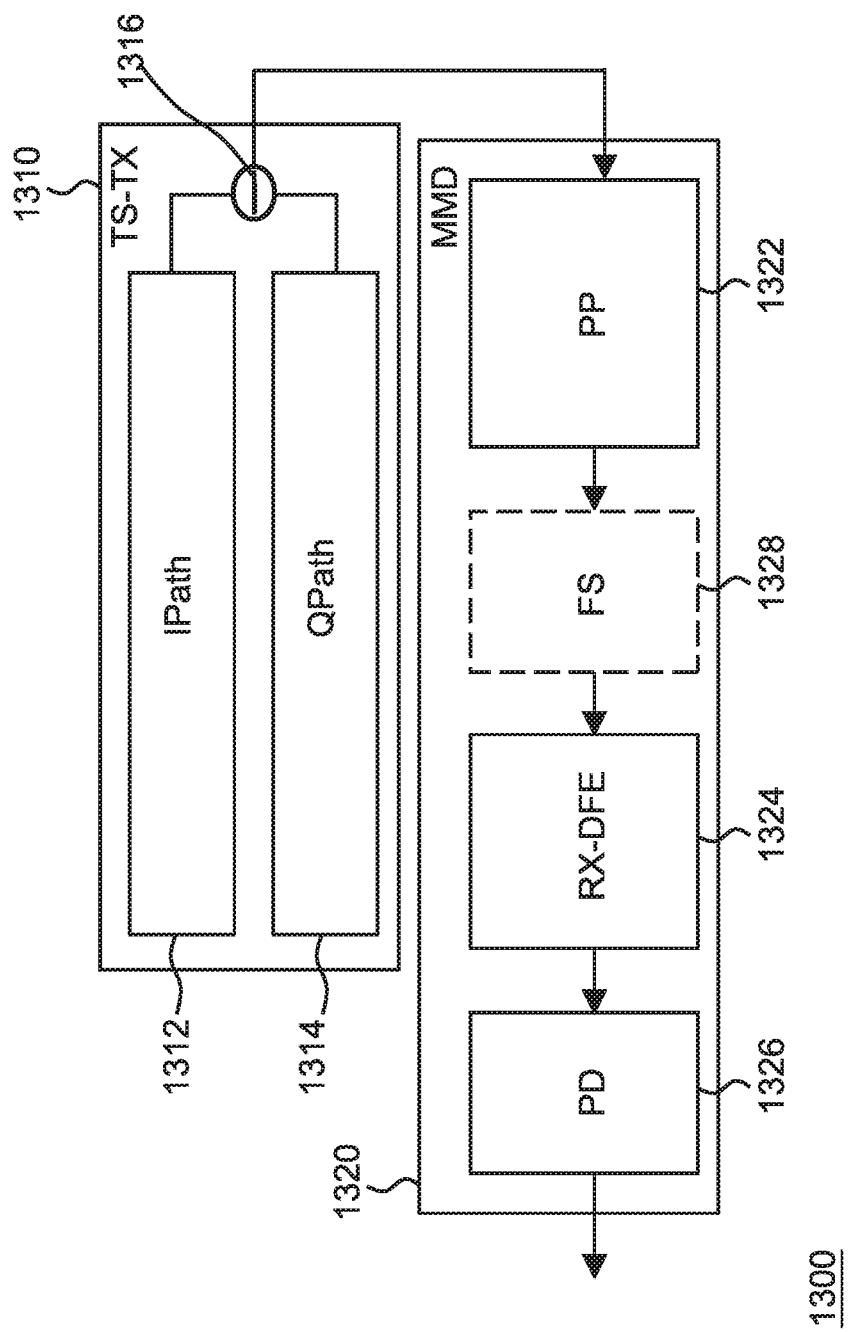
FIG. 13 is a schematic diagram of a mismatch detecting device according to an embodiment of the present invention.

The present invention further provides a mismatch detecting device capable of detecting frequency-dependent mismatch and frequency-independent mismatch. FIG. 13 shows a schematic diagram of the mismatch detecting device. As shown, a mismatch detecting device 1300 includes a test signal transmitting circuit (denoted as TS-TX), and a mismatch detecting circuit (denoted as MMD) 1320. The test signal transmitting circuit 1310, synchronously outputting an in-phase signal and a quadrature-phase signal, includes: an in-phase signal transmission path (denoted as IPath) 1312 that transmits and processes the in-phase signal; a quadrature-phase signal transmission path (denoted as QPath) 1314 that transmits and processes the quadrature-phase signal; and an operator 1316, coupled to the in-phase and quadrature-phase transmission paths 1312 and 1314, generating a joint signal according to the transmitted and processed in-phase and quadrature-phase signals. The mismatch detecting circuit 1320, detecting the power of the joint signal to generate a detection result, includes: a pre-processing circuit (denoted as PP) 1322, generating a digital signal according to the joint signal; and receiver digital front-end circuit (denoted as RX-DFE) 1324, generating a signal to be detected according to the digital signal; and a power detector (denoted as PD) 1326, detecting the power of the signal to be detected to generate the detection result. In this embodiment, the mismatch detecting circuit 1320 may selectively include: a frequency level shifter (denoted as FS) 1328, coupled to the pre-processing circuit 1322, when absolute values of frequencies of the digital-to-analog converted signals of the in-phase and quadrature-phase signals that the test signal transmitting circuit 1310 synchronously outputs fall between one-quarter and one-half of a predetermined bandwidth, levelly shifting the frequency of at least a part of the digital signal and outputting the digital signal to the digital front-end circuit 1324, or else directly outputting the digital signal to the receiver digital front-end circuit 1324.

In conclusion, the device and method of the present invention are capable of synchronously processing frequency-dependent mismatch and frequency-independent mismatch, thereby preventing issues caused by asynchronous processing as well as reinforcing detection and compensation efficiency at the same time.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mismatch compensating device, capable of synchronously processing a frequency-dependent mismatch response and frequency-independent gain and phase mismatch, comprising:
   a signal generator, synchronously outputting a first signal and a second signal;
   a gain and phase compensator, processing the first and second signals according to a gain parameter and a phase parameter to generate a compensated first signal and a compensated second signal;
   a digital-to-analog converter (DAC), performing a digital-to-analog conversion on the compensated first signal and the compensated second signal to generate a first analog signal and a second analog signal;
   an analog front-end circuit, processing the first and second analog signals to output a joint signal;
   a mismatch detecting circuit, detecting a power of the joint signal to generate a detection result associated with the gain parameter and the phase parameter, comprising:
      a pre-processing circuit, generating a digital signal according to the joint signal;
      a digital front-end circuit, generating a signal to be detected according to the digital signal, wherein the digital front-end circuit sequentially performs an adjacent channel interference (ACI) filter process and a frequency down-conversion process on the digital signal to generate the signal to be detected; and
      a power detector, detecting a power of the signal to be detected to generate the detection result;
   a frequency-dependent mismatch compensator, compensating at least one of the first signal and the second signal to compensate the frequency-dependent mismatch response; and
   a control circuit, setting the gain parameter and the phase parameter according to the detection result, and setting a parameter of the frequency-dependent mismatch compensator according to the detection result.

2. The mismatch compensating device according to claim 1, wherein the signal generator gradually changes frequencies of the first and second signals, and the frequencies of the first and second signals are non-zero and fall in a predetermined bandwidth.

3. The mismatch compensating device according to claim 1, wherein the first and second signals outputted by the signal generator are an in-phase signal and a quadrature-phase signal, respectively.

4. The mismatch compensating device according to claim 1, wherein the gain and phase compensator comprises:
   a phase compensator, generating the compensated first signal according to the phase parameter and the first signal, and generating a phase compensated signal according to the phase parameter and the second signal; and
   a gain compensator, generating the compensated second signal according to the gain parameter and the phase compensated signal.

5. The mismatch compensating device according to claim 1, wherein the analog front-end circuit comprises:
   a first transmission path, performing a first filter process and a first modulation process on the first analog signal to generate a first modulated signal;
   a second transmission path, performing a second filter process and a second modulation process on the second analog signal to generate a second modulated signal; and
   an operator, generating the joint signal according to the first and second modulated signals.

6. The mismatch compensating device according to claim 1, wherein the pre-processing circuit sequentially performs a positive value generating operation, a direct-current removal process, a filter process and an analog-to-digital conversion process on the joint signal to generate the digital signal.

7. The mismatch compensating device according to claim 1, wherein the mismatch detecting circuit further comprises:
   a frequency level shifter, coupled between the pre-processing circuit and the digital front-end circuit, levelly shifting a frequency of at least a part of the digital signal to cause the frequency of the entire digital signal to fall in a predetermined bandwidth.

8. The mismatch compensating device according to claim 7, wherein when absolute values of frequencies of the first and second analog signals generated by the DAC fall between one-quarter and one-half of the predetermined bandwidth, the frequency level shifter substrates the frequency bandwidth from the digital signal having a positive frequency, or adds the bandwidth to the digital signal having a negative frequency, to levelly shift the frequency of at least a part of the digital signal.

9. A mismatch compensating method, capable of synchronously processing a frequency-dependent mismatch response and frequency-independent gain and phase mismatch, comprising steps of:
   synchronously outputting a first signal and a second signal;
   processing the first and second signals according to a gain parameter and a phase parameter to generate a compensated first signal and a compensated second signal;
   performing a digital-to-analog conversion on the compensated first signal and the compensated second signal to generate a first analog signal and a second analog signal;
   processing the first and second analog signals to output a joint signal;
   detecting a power of the joint signal to generate a detection result associated with the gain parameter and the phase parameter, wherein the step of generating the detection result comprises:
      generating a digital signal according to the joint signal, wherein the step of generating the digital signal comprises: sequentially performing a positive value generating operation, a direct-current removal process, a filter process and an analog-to-digital conversion process on the joint signal to generate the digital signal;
      generating a signal to be detected according to the digital signal; and
      detecting a power of the signal to be detected to generate the detection result;
   setting the gain parameter and the phase parameter according to the detection result to compensate the frequency-independent gain and phase mismatch; and
   setting a compensation parameter according to the detection result to compensate the frequency-dependent mismatch response, wherein the at least one compensation parameter is for compensating at least one of the first signal and the second signal.

10. The mismatch compensating method according to claim 9, wherein the step of synchronously outputting the first and second signals comprises gradually changing frequencies of the first and second signals, and the frequencies of the first and second signals are non-zero and fall in a predetermined bandwidth.

11. The mismatch compensating method according to claim 9, wherein the step of generating the compensated first and second signals comprises:
    generating the compensated first signal according to the phase parameter and the first signal;
    generating a phase compensated signal according to the phase parameter and the second signal; and
    generating the compensated second signal according to the gain parameter and the phase compensated signal.

12. The mismatch compensating method according to claim 9, wherein the step of generating the detection result further comprises:
    levelly shifting a frequency of at least a part of the digital signal to cause the frequency of the entire digital signal to fall in a predetermined bandwidth.

13. The mismatch compensating method according to claim 12, wherein when a difference between absolute values of frequencies of the first and second analog signals outputted in the step of generating the first and second analog signals and a cut-off frequency of the predetermined bandwidth fall between one-quarter and one-half of the predetermined bandwidth, the step of levelly shifting the frequency of at least a part of the digital signal comprises: subtracting the frequency bandwidth from the digital signal having a positive frequency, or adding the bandwidth to the digital signal having a negative frequency, to levelly shift the frequency of at least a part of the digital signal.

14. A mismatch detecting device, detecting frequency-dependent mismatch and frequency-independent mismatch, comprising:
    a test signal transmitting circuit, synchronously outputting an in-phase signal and a quadrature-phase signal, comprising:
        an in-phase transmission path, transmitting the in-phase signal;
        a quadrature-phase transmission path, transmitting the quadrature-phase signal; and
        an operator, coupled to the in-phase and quadrature-phase transmission paths, generating a joint signal according to the transmitted in-phase and quadrature-phase signals; and
    a mismatch detecting circuit, detecting a power of the joint signal to generate a detection result, comprising:
        a pre-processing circuit, generating a digital signal according to the joint signal;
        a receiver digital front-end circuit, generating a signal to be detected according to the digital signal;
        a power detector, detecting a power of the signal to be detected to generate the detection result; and
        a frequency level shifter, coupled to the pre-processing circuit, when a difference between absolute values of frequencies of the digital-to-analog converted in-phase and quadrature-phase signals synchronously outputted by the test signal transmitting circuit and a cut-off frequency of the predetermined bandwidth is smaller than one-quarter of the predetermined bandwidth, the frequency level shifter levelly shifting a frequency of at least a part of the digital signal and outputting the digital signal to the receiver digital front-end circuit, or else the frequency level shifter directly outputting the digital signal to the receiver digital front-end circuit.

15. A mismatch compensating method, capable of synchronously processing a frequency-dependent mismatch response and frequency-independent gain and phase mismatch, comprising steps of:
    synchronously outputting a first signal and a second signal;
    processing the first and second signals according to a gain parameter and a phase parameter to generate a compensated first signal and a compensated second signal;
    performing a digital-to-analog conversion on the compensated first signal and the compensated second signal to generate a first analog signal and a second analog signal;
    processing the first and second analog signals to output a joint signal;
    detecting a power of the joint signal to generate a detection result associated with the gain parameter and the phase parameter, wherein the step of generating the detection result comprises:
        generating a digital signal according to the joint signal;
        generating a signal to be detected according to the digital signal by performing an ACI filter process and a frequency down-conversion process on the digital signal to generate the signal to be detected; and
        detecting a power of the signal to be detected to generate the detection result;
    setting the gain parameter and the phase parameter according to the detection result to compensate the frequency-independent gain and phase mismatch; and
    setting a compensation parameter according to the detection result to compensate the frequency-dependent mismatch response, wherein the at least one compensation parameter is for compensating at least one of the first signal and the second signal.

* * * * *